United States Patent [19]
Gabas et al.

[11] Patent Number: 5,265,494
[45] Date of Patent: Nov. 30, 1993

[54] AUTOMOBILE ACCELERATOR CABLE EFFORT INCREMENTING DEVICE

[75] Inventors: Carlos Gabas, Barcelona; Agustin Roca, Rubi, both of Spain

[73] Assignee: Pujol y Tarrago S.A., Rubi, Spain

[21] Appl. No.: 773,605

[22] PCT Filed: Mar. 13, 1991

[86] PCT No.: PCT/ES91/00014
§ 371 Date: Nov. 22, 1991
§ 102(e) Date: Nov. 22, 1991

[87] PCT Pub. No.: WO91/14595
PCT Pub. Date: Oct. 3, 1991

[30] Foreign Application Priority Data
Mar. 22, 1990 [ES] Spain ............ P-9000818

[51] Int. Cl.⁵ .................................. F16C 1/10
[52] U.S. Cl. .................. 74/501.5 R; 74/502; 74/502.4
[58] Field of Search ........... 74/501.5 R, 500.5, 501.6, 74/502, 503; 192/111 A

[56] References Cited

U.S. PATENT DOCUMENTS

| | | | |
|---|---|---|---|
| 4,378,713 | 4/1983 | Haskell et al. | 74/501.5 R |
| 4,464,950 | 8/1984 | Deligny | 74/501.5 R |
| 4,549,709 | 10/1985 | Deligny | 74/501.5 R |
| 4,598,809 | 7/1986 | Glover et al. | 192/111 A X |
| 4,641,816 | 2/1987 | Kishida et al. | 74/502 X |
| 4,688,438 | 8/1987 | Bohler et al. | 74/501.5 R |
| 4,693,137 | 9/1987 | Deligny | 192/111 A X |
| 4,787,263 | 11/1988 | Jaksic | 192/111 A X |
| 4,887,705 | 12/1989 | Solano et al. | 74/501.5 R |
| 4,955,252 | 9/1990 | Clissett et al. | 74/501.5 R |

*Primary Examiner*—Vinh T. Luong
*Attorney, Agent, or Firm*—Michael J. Striker

[57] ABSTRACT

An automobile accelerator cable effort incrementing device has a hollow main body member having two ends, a steel cable provided with a sheath and ends connected with the ends of the main body member and connected to each of the ends so as to connect an accelerator pedal to a motor vehicle carburetor, a mechanical element for connecting the steel cable with the ends of the steel cable so that the steel cable may slide, stripped of the sheath, in an interior of the main body member, a mechanical effort incrementing element snugly housed in the main body member and a U-shaped fixing body member with a mechanical element for attaching the fixing body member and therefore establishing a position in the interior of the main body member from which the mechanical effort incrementing elements are operative.

15 Claims, 2 Drawing Sheets

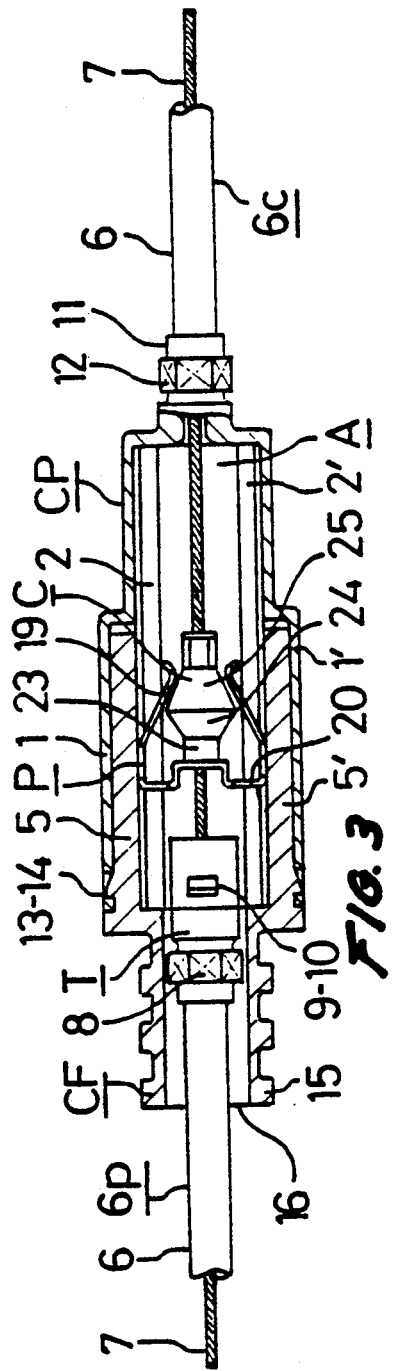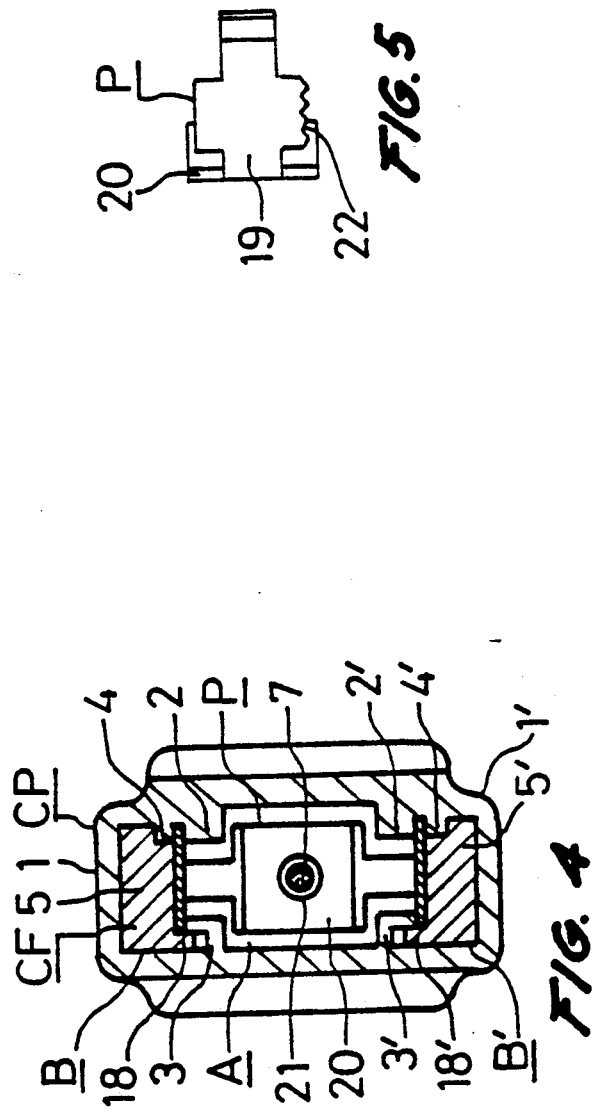

AUTOMOBILE ACCELERATOR CABLE EFFORT INCREMENTING DEVICE

BACKGROUND OF THE INVENTION

The present invention relates to an automobile accelerator cable effort incrementing device which is applicable to private passenger cars and to transport vehicles in general.

It is well known that the accelerator pedal is directly connected in automobiles to the corresponding carburetor device of the engine, normally by means of a steel cable having a protective sheath. One or more points of anchorage may be established along the layout of the cable and sheath to define the route thereof. This will be more or less complex depending on the relative position of the said accelerator pedal and carburetor.

The rest position of the accelerator pedal is defined by the urge of one or several springs acting permanently for this purpose. In this way, when the vehicle driver presses the accelerator pedal, he only has to overcome the resistance of said springs, while, on releasing the pressure from the pedal, this returns automatically to the rest position.

Under the above described conditions, the vehicle driver may progressively establish any operating conditions of the engine, determined by the position occupied by the accelerator pedal, by pressing on the pedal without any greater obstacle than the linear urge of the spring or springs.

The relationship between the pressure applied to the accelerator pedal by the vehicle driver and the engine operating conditions, described above, is a clear drawback in automobiles of new design. In fact, the high levels of sound-proofing and running comfort attained in the passenger compartment of present day automobiles mean that the control of the vehicle speed by the driver is exercised to a great extent only by direct observation of the speedometer installed on the dashboard. In view of normal driving conditions, such observation is not made with sufficient regularity, which is the frequent cause of excess speed and mechanical overloads on the carburetor mechanisms.

SUMMARY OF THE INVENTION

Accordingly, it is an object of the present invention to provide an automobile accelerator cable effort incrementing device which provides a solution to the problem raised by driver control over the vehicle speed independently of direct observation of the speedometer and so as to avoid mechanical overloads on the carburetor mechanism.

This device according to the invention is designed so that, from a certain engine acceleration level, the driver is required notably to increase the pressure on the accelerator pedal to continue accelerating. In this way he is aware that he has reached a point at which the engine is revving at a high speed. On the other hand, the device of the invention does not represent any obstacle for the return stroke of the accelerator pedal, i.e. during the return to the rest position.

The device may be fitted as original equipment in any intermediate point appropriate to the conditions peculiar to each particular application in the layout of the sheathed steel cable between the accelerator pedal and the vehicle carburetor, without said cable being interrupted in any way.

The automobile accelerator cable effort incrementing device of the invention is characterized in that it is constituted by a hollow, essentially parallelepipedic main body member open on one side thereof, which main body member is attached at the end comprising the open side and at the opposite end thereto, to the sheath of the steel cable connecting the accelerator pedal to the motor vehicle carburetor, said connection is effected by mechanical means which maybe formed in said main body member and which are suitably dimensioned so that said steel cable may slide, stripped of the sheath, in the interior of said main body member, said body member is suitably dimensioned snugly to house the mechanical effort incrementing means and a U-shaped fixing body member which, provided with mechanical means for attachment thereof to a fixed point, establishes the position in the interior of the main body member from which the mechanical effort incrementing means are operative.

The main body member, which is made preferably from plastics materials having suitable mechanical properties, is formed in the interior thereof with longitudinal ribs which extend over a sufficient distance to define housings. The arms forming the U-shaped fixing body member and the mechanical means causing the effort increment may snugly slide in the housings.

The mechanical means allowing the main body member to be connected to the corresponding ends of the steel cable sheath are formed, at the end comprising the open face, by an essentially parallelepipedic terminal firmly attached to the corresponding end of the steel cable sheath. The terminal may be housed in part in the main body or may be firmly coupled to said main body member by the mutual engagement of corresponding fixing projections and retaining housings. They are conveniently dimensioned and disposed in sufficient number, and formed on said terminal and main body member. They are also formed, at the opposite end, by an essentially cylindrical extension provided with a longitudinal through bore appropriately dimensioned snugly to receive and firmly retain the other end of the steel cable sheath.

The U-shaped fixing body member which, as said above, sets the position of the mechanical means causing the effort increment, is made, like the main body member, of plastics materials having appropriate mechanical properties for the intended purpose.

The U shaped fixing body member corresponds dimensionally to the housings defined therefor by the longitudinal ribs formed in the interior of the main body member. It is possible to couple both together by the action of corresponding fixing projections and retaining housings which in sufficient number and conveniently dimensioned and disposed are formed on the arms of said U-shaped and main body members. The arms also have formed thereon corresponding transverse projections which, appropriately dimensioned, may set the position in which the mechanical effort incrementing means are operative.

The base of the U-shaped fixing body member is formed with a longitudinal extension, diametrally opposite to the arms of said fixing body member, which is provided with a through bore dimensioned for the sheathed steel cable to slide suitably therethrough. The extension is dimensioned and shaped so as to allow attachment of the device to a fixed point of the vehicle structure.

The mechanical means for causing the effort increment, which is snugly housed in the main body member, is formed by a clip acting transversely to the longitudinal axis of the main body member. The clip is provided with retaining teeth which, by means of the transverse projections formed on both arms of the fixing body member, set the position of said clip in the main body member. By a pressure member which is appropriately disposed relative to the clip the clip is firmly attached to the steel cable.

The pressure member is characterized in that its contour, which is a revolution, is provided at least, on the side facing the clip and in functional correspondence therewith, with an essentially frustoconical surface. The slope of the surface relative to the longitudinal axis of the steel cable to which it is attached, determines the degree of effort increment.

Thus it will be seen that, with the device of the invention suitably assembled in an intermediate point of the run of the sheathed steel cable between the accelerator pedal and the corresponding mechanism of the carburetor, the effort to be applied to the accelerator pedal during the engine acceleration is unvaried relative to known conditions until the time when the pressure member, moving with the cable, reaches the position occupied by the clip. At this time, if the driver continues to press on the accelerator pedal, he will have to apply a greater effort to overcome the resistance set up by the joint action of the clip and the pressure member. The effort increase due to this joint action will depend in intensity and duration on the contour of the pressure member coacting appropriately with the clip. Said effort increment may be essentially transitional or may extend until the end of the possible pedal stroke. Furthermore, the action of the opposing springs during the return of the accelerator pedal to the rest position is not affected in any way by the action of the device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a cross-section view of the device of the invention showing the maximum position attained by the effort incrementing means.

FIG. 4 is an enlarged view on the line IV—IV of FIG. 2.

FIG. 5 is a side view of one component of the device of the invention.

DETAILED DESCRIPTION OF THE PREFERRED EMBODIMENT

Figure 1:
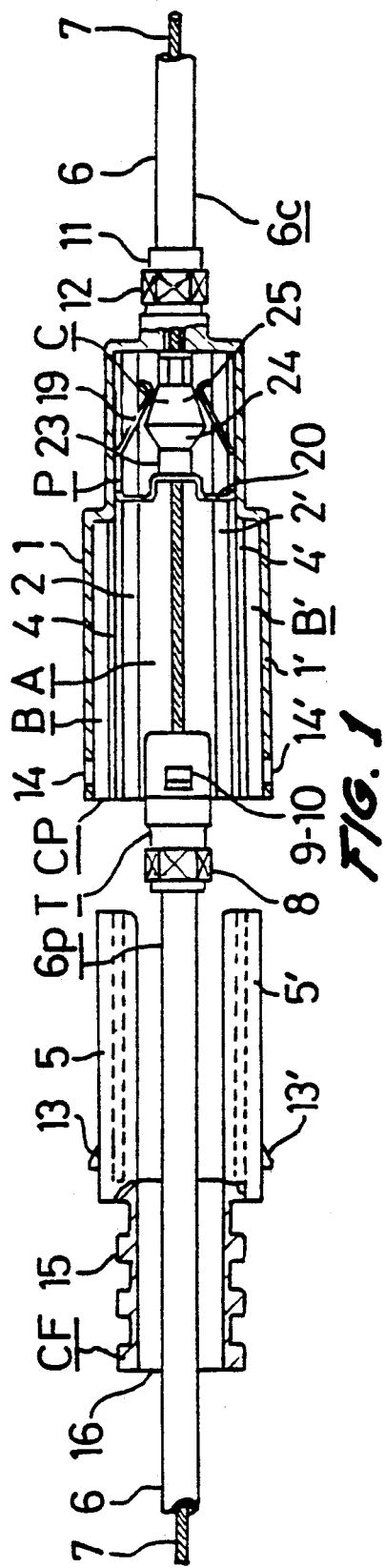
FIG. 1 is a view of the device of the invention, in an assembled stage, partly in section.

The automobile accelerator cable effort incrementing device of the invention includes a man body member CP of ample dimensions which snugly houses the remaining components of the device, a terminal T partly housed in the main body member CP and a fixing body member CP determining the position in which the effort incrementing means P and C are operative.

The main body member CP is made preferably from plastics materials of appropriate mechanical properties and, as shown in all the drawing sheet Figures, is essentially parallelepipedic. It is provided with transverse extensions 1 and 1', suitably dimensioned snugly to house the fixing body member CF partially.

FIG. 4 shows in detail how the interior of the main body member CP is formed with longitudinal ribs 2—2' and 3—3' defining the housing A through which the clip P forming the effort incrementing means may snugly slide. Likewise, longitudinal ribs 4—4', which are adjacent the ribs 2—2' respectively and which extend along the transverse extensions 1—1' formed in the main body member CP, define the housing B—B' which may snugly contain the arms 5—5' constituting the fixing body member CF.

Figure 2:
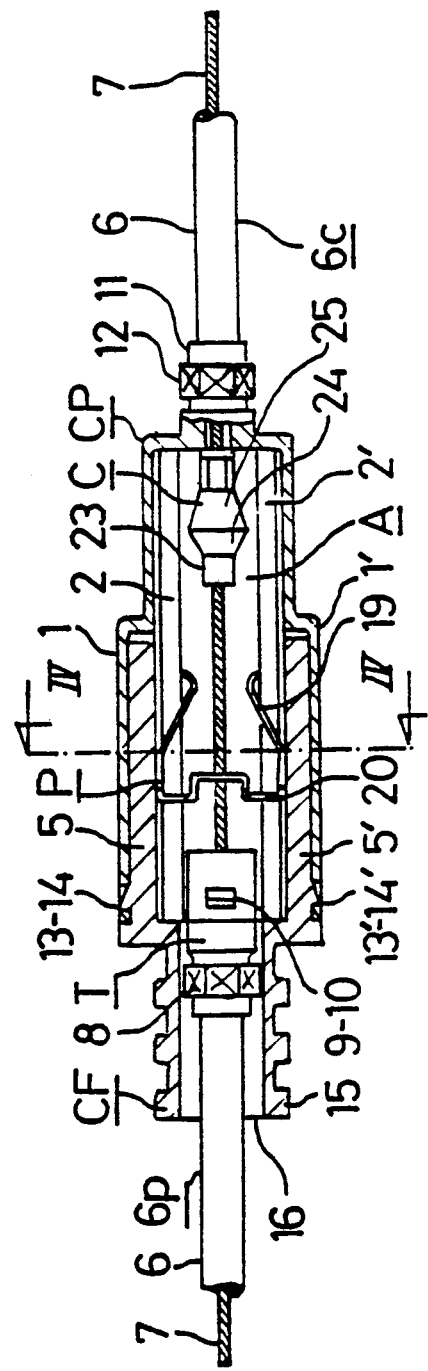
FIG. 2 is a cross-section of the device of the invention, once assembled.

FIGS. 1, 2 an 3 show how the main body member CP is firmly attached to ends 6p and 6c of a sheath 6 of a steel cable 7 linking the accelerator pedal with the automobile engine carburetor which, for clarity, have not been shown in the drawing sheets.

In this embodiment, the end 6p of the sheath 6 of the steel cable 7 is on the accelerator peal side, while the end 6c of the same sheath 6 is on the automobile engine carburetor side.

The end 6p of the sheath 6 is firmly terminal T by a pertinent holding clamp 8. The terminal T is in turn attached to the main body member CP by the joint action of attachment projections 9 and retaining housings 10 formed respectively on the terminal T and the main body member CP, once connected together, they may not become separated from one another under normal conditions of use.

Furthermore, the end 6c of the sheath 6 is attached to the main body member CP by a longitudinal extension 11 and a holding clamp 12. The extension 11 is provided with a through orifice so dimensioned as to be able snugly to receive a sufficiently long portion of the end 6c and simultaneously allow the steel cable 7 suitably to slide therethrough, all as shown in FIGS. 1, 2 and 3.

The fixing body member CF is formed with the extension 15, shown in FIGS. 1, 2 and 3. The extension 15 being of suitable dimensions, is designed for the attachment of the device of the invention to a fixed point of the automobile structure which, for reasons similar to those stated hereinbefore, has both been shown in the drawing sheets. The extension 15 is provided with a through bore 16 through which the sheathed steel cable 7 may suitably slide.

FIG. 1 shows in detail how the arms 5—5' of the fixing body member CF are provided with fixing projections 13—13', respectively, which mate dimensionally with retaining housings 14—14' provided in turn in the main body member CP. As shown in FIGS. 2 and , 3, once the fixing body member CF and the main body ember CP have been attached together, they may not come apart under normal conditions of use.

The arms 5—5' of the fixing body member CF are formed with transverse extensions 18—18', respectively. They are coextensive with the arms 5—5' and designed to set the position, in the interior of the main body member CP, of the clip P forming the effort incrementing member.

The clip P is preferably made of metallic materials having a high degree of resilience and mechanical strength, such a bronze, brass and certain types of steel.

In this embodiment, FIGS. 1, 2, 3 and 5 show the shape adopted for said clip P. There are two pressure arms 19 and a connecting bridge member 20 provided with a through hole 21 through which the steel cable 7 may suitably slide.

FIG. 5 shows in detail how the pressure arms 19 of the clip P are provided, respectively, with retaining teeth 22. The teeth are designed to fix the position of the clip P permanently in the main body member CP by engagement with the transverse extensions 18—18′ formed on the arms 5—5′ of the fixing body member CF.

The pressure member C which, together with the clip P, form the effort incrementing means, is made preferably from metallic materials such as steel and is firmly attached to the steel cable 7 which, without the sheath 6, crosses through the main body CP.

In this embodiment, FIGS. 1, 2 and 3 show the shape of the pressure member C. It has a cylindrical portion 23 attached to the smaller end of a frustoconical portion 24 which in turn is connected at the larger end thereof to a second frustoconical portion 25 such that the cylindrical portion 23 is facing the connecting bridge member 20 of the clip P.

As described above, the joint engagement of the clip P and of the pressure member C causes the effort increment which is to be applied to the accelerator pedal beyond a certain point. To be precise the increment is determined by the engagement of the pressure arms 19 of the clip P with the frustoconical portion 24 of the pressure member C due to the sloping for a of the frustoconical portion 24 relative to the longitudinal axis of the steel cable 7.

Logically, the dimensions and degree of slope of said frustoconical portion relative to the pressure arms 19 determine the degree and duration of the effort increment. The frustoconical portion 24 may have any form and dimensions required, depending on each particular application.

FIG. 1 shows the device of the invention as it is originally supplied. Under these conditions, with the corresponding ends of the steel cable 7 with sheath 6 being appropriately connected to the accelerator pedal and to the vehicle engine carburetor and with both the accelerator pedal and the carburetor in the rest position, the assembly and adjustment of the components of the device of the invention is started. The accelerator pedal is depressed to the maximum position corresponding to the maximum engine acceleration, simultaneously the pressure member C fixedly attached to the steel cable 7 pushes the clip P which may slide along the grooves defined by the longitudinal ribs 2-4 and 2′-4′ formed on the main body member CP as shown in FIG. 4, until it reaches the position shown in FIG. 2. Then, while maintaining the pressure on the accelerator pedal, the arms 5—5′ of the fixing body member CF are inserted in the housings B—B′ defined in the main body member CP until both components are coupled together by engagement of the fixing projections 13 and the through retaining housings 14 formed on the fixing body member CF in the housings B—B′ of the main body member CP involves simultaneously the engagement of the transverse extensions 18—18′ formed on said arms 5—5′ with the pressure arms 19 of the clip P. This causes engagement of the retaining teeth 22 formed on the pressure arms 19, thereby preventing any subsequent movement of the said clip P.

FIG. 2 shows the device of the invention once the main body member CP and the fixing body member CF have been coupled together and the accelerator pedal is in the rest position.

FIG. 3 shows the position occupied by the pressure member C, corresponding to maximum acceleration of the vehicle engine, once the resistance offered by the joint engagement of the said pressure member C and the clip P has been overcome by an increment of the effort on the accelerator pedal.

It will be understood that each of the elements described above, or two or more together, may also find a useful application in other types of constructions differing from the types described above While the invention has been illustrated and described as embodied in an automobile accelerator cable effort incrementing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An automobile accelerator cable effort incrementing device, comprising a hollow main body member having two ends; a steel cable provided with a sheath and ends connected with said ends of said main body member; mechanical means for connecting said steel cable with said ends of said main body member so that said steel cable slides, stripped of steel sheath, in an interior of said main body member; mechanical effort incrementing means snugly housed in said main body member; and a U-shaped fixing body member establishing a position in the interior of said main body member from which said mechanical effort incrementing means are operative, said main body member being provided with a plurality of inner longitudinal ribs to define housing in which said U-shaped fixing body member and said mechanical effort incrementing means snugly slide.

2. An automobile accelerator cable effort incrementing device as defined in claim 1, wherein said main body member has a parallelepipedic shape and is open at one of said ends of said main body member.

3. An automobile accelerator cable effort incrementing device as defined in claim 1, wherein said U-shaped fixing body member has arms which snugly slide in said housings.

4. An automobile accelerator cable effort incrementing device as defined in claim 1, wherein said mechanical means for connecting ends of said sheath of said steel cable with said main body member include a terminal attached to one end of said sheath of said steel cable and partially housed in said main body member, and a substantially cylindrical extension provided at another end of said main body member and having a longitudinal bore for snugly receiving another end of said sheath of said steel cable.

5. An automobile accelerator cable effort incrementing device as defined in claim 4, and further comprising means for engaging said terminal of said steel cable with said main body member, said engaging means including an engaging projection provided in one of said terminals and said body member and an engaging housing provided in another of said terminal and said body member and engaged with said projection.

6. An automobile accelerator cable effort incrementing device as defined in claim 1, and further comprising means for coupling said U-shaped fixing body member with said main body member, said coupling means including a coupling projection provided on one of said fixing body member and said main body member and a fixing housing provided on another of said fixing body member and said main body member and coupled with said fixing projection.

7. An automobile accelerator cable effort incrementing device as defined in claim 6, wherein said U-shaped fixing body member has arms on which said coupling projection is provided, said arms also having transverse projections which determine a position in which said mechanical effort incrementing means is operative.

8. An automobile accelerator cable effort incrementing device as defined in claim 1, wherein said U-shaped fixing body member has arms and a longitudinal extension provided with a through bore for slidingly receiving said sheath of said steel cable.

9. An automobile accelerator cable effort incrementing device, comprising a hollow main body member having two ends; a steel cable provided with a sheath and ends connected with said ends of said main body member; mechanical means for connecting said steel cable with said ends of said main body member so that said steel cable slides, stripped of steel sheath, in an interior of said main body member; mechanical effort incrementing means snugly housed in said main body member; a U-shaped fixing body member establishing a position in the interior of said main body member from which said mechanical effort incrementing means are operative, said main body member having a longitudinal axis, said mechanical effort incrementing means including a clip acting transversely to said longitudinal axis of said main body member and provided with retaining teeth, said fixing body member having arms provided with transverse projections which cooperate with said retaining teeth so that a position of said clip in said main body member is set; and a pressure member attached to said steel cable and cooperating with said clip.

10. An automobile accelerator cable effort incrementing device as defined in claim 9, wherein said main body member has a parallelepipedic shape and is open at one of said ends of said main body member.

11. An automobile accelerator cable effort incrementing device as defined in claim 9, and further comprising means for coupling said U-shaped fixing body member with said main body member, said coupling means including a coupling projection provided on one of said fixing body member another of said fixing body member and said main body member and coupled with said fixing projection.

12. An automobile accelerator cable effort incrementing device as defined in claim 11, wherein said U-shaped fixing body member has arms on which said coupling projection is provided, said arms also having transverse projections which determine a position in which said mechanical effort incrementing means is operative.

13. An automobile accelerator cable effort incrementing device as defined in claim 9, wherein said U-shaped fixing body member has arms and a longitudinal extension provided with a through bore for slidingly receiving said sheath of said steel cable.

14. An automobile accelerator cable effort incrementing device as defined in claim 9, wherein said pressure member is formed as a body of revolution.

15. An automobile accelerator cable effort incrementing device as defined in claim 14, wherein said pressure member has a side facing said clip and having a frustoconical surface, said frustoconical surface having a slope relative to a longitudinal axis of said steel cable so as to determine a degree of effort increment.

* * * * *